(12) United States Patent
Beer et al.

(10) Patent No.: US 8,465,008 B2
(45) Date of Patent: Jun. 18, 2013

(54) COMPLEX WAVE SPRING

(75) Inventors: Robert C. Beer, Noblesville, IN (US); Mark A. Ebenhart, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 112 days.

(21) Appl. No.: 13/164,014

(22) Filed: Jun. 20, 2011

(65) Prior Publication Data

US 2012/0318574 A1 Dec. 20, 2012

(51) Int. Cl.
*F16F 1/20* (2006.01)

(52) U.S. Cl.
USPC .............................. 267/160; 267/164; 439/74

(58) Field of Classification Search
USPC ................. 267/158–161, 180, 182; 439/66, 439/74, 607; 24/67.11
See application file for complete search history.

(56) References Cited

U.S. PATENT DOCUMENTS

| | | | |
|---|---|---|---|
| 4,662,706 A | 5/1987 | Foley | |
| 4,991,269 A * | 2/1991 | Kuroda | 24/67.11 |
| 5,083,927 A | 1/1992 | Herard et al. | |
| 5,299,939 A * | 4/1994 | Walker et al. | 439/74 |
| 5,653,615 A | 8/1997 | Inaba et al. | |
| 5,917,147 A * | 6/1999 | Lewis | 174/354 |
| 6,254,439 B1 | 7/2001 | Endo et al. | |
| 6,266,253 B1 | 7/2001 | Kurrer et al. | |
| 6,299,999 B1 * | 10/2001 | Buchner et al. | 429/434 |
| 6,815,113 B2 * | 11/2004 | Franklin et al. | 429/468 |
| 6,875,063 B2 | 4/2005 | Zhao et al. | |
| 7,387,548 B2 | 6/2008 | Takehara et al. | |
| 7,462,078 B2 | 12/2008 | Mao | |
| 7,520,787 B2 | 4/2009 | Waltz et al. | |
| 2003/0160396 A1 * | 8/2003 | Dean | 277/628 |
| 2006/0089048 A1 * | 4/2006 | Packham | 439/607 |
| 2007/0123084 A1 | 5/2007 | Takehara et al. | |

* cited by examiner

*Primary Examiner* — Christopher Schwartz
(74) *Attorney, Agent, or Firm* — Lawrence D. Hazelton

(57) ABSTRACT

A complex wave spring, or Beer Spring™, for electrically coupling opposed electrical contact surfaces or generating a relatively constant force. The spring includes a first wave portion shaped to define a first upward undulation and a first downward undulation, and a second wave portion fixedly arranged relative to the first wave portion. The second wave portion is shaped to define a second upward undulation proximate to the first downward undulation, and a second downward undulation proximate to the first upward undulation. The spring may be formed of electrically conductive material suitable for electrically coupling electrical contact surfaces when the spring is in contact between the surfaces. The complex spring provides unusually constant spring forces over a relatively wide range of compression distances.

11 Claims, 6 Drawing Sheets

COMPLEX WAVE SPRING

TECHNICAL FIELD OF INVENTION

This disclosure generally relates to a spring device, and more particularly relates to a complex wave spring that includes multiple wave springs and other features to provide unusual spring constant characteristics.

BACKGROUND OF INVENTION

It is known to mechanically and/or electrically couple contact surfaces with a spring to mechanically force the contact surfaces together in order to make intimate electrical, thermal, and/or mechanical contact with one another. It is also known to couple electrical contact surfaces by placing an electrical contact/spring device such as a star washer between electrical contacts in order to create a plurality of electrical connection between opposed contact surfaces. Without the electrical contact spring, the contours and surface finishes of the electrical contact surfaces must be controlled to prevent instances of single point contact that may cause unacceptably high electrical contact resistance, especially in high current applications. Providing adequate force to assure a stable, low thermal and/or electrical contact resistance may be by way of clamping or fastening each thermal and/or electrical contact.

Many electrical assemblies have multiple electrical/thermal connections either within the assembly or for making electrical connections with other electrical assemblies via a wiring harness, or for making thermal contact with a heat sink. It is preferable to make these connections using a single group wise connection, i.e.—without having to rely on distinct fasteners or clamps for each individual electrical/thermal contact. Also, it is desirable to have a spring that provides a contact force that is relatively constant over a distance corresponding to the tolerance stack of the assembly. In particular, when a spring is used to assure good thermal contact with an integrated circuit die, too high a spring force may damage the die, and too low a spring force may result in inadequate thermal coupling. Similarly for electrical contacts, the total force necessary to assure that each electrical contact experiences a minimum force may require undesirable reinforcement of the structure generating the total force if the spring force varies greatly with distance. If a connector assembly having multiple high current connectors is used, the insertion force may be undesirably high and so require purchasing costly tools and/or insertion aids.

SUMMARY OF THE INVENTION

In accordance with one embodiment, a complex wave spring is provided. The complex wave spring includes a first wave portion and a second wave portion. The first wave portion is shaped to define at least a first upward undulation and a first downward undulation. The second wave portion is fixedly arranged relative to the first wave portion. The second wave portion is shaped to define at least a second upward undulation proximate to the first downward undulation, and a second downward undulation proximate to the first upward undulation.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
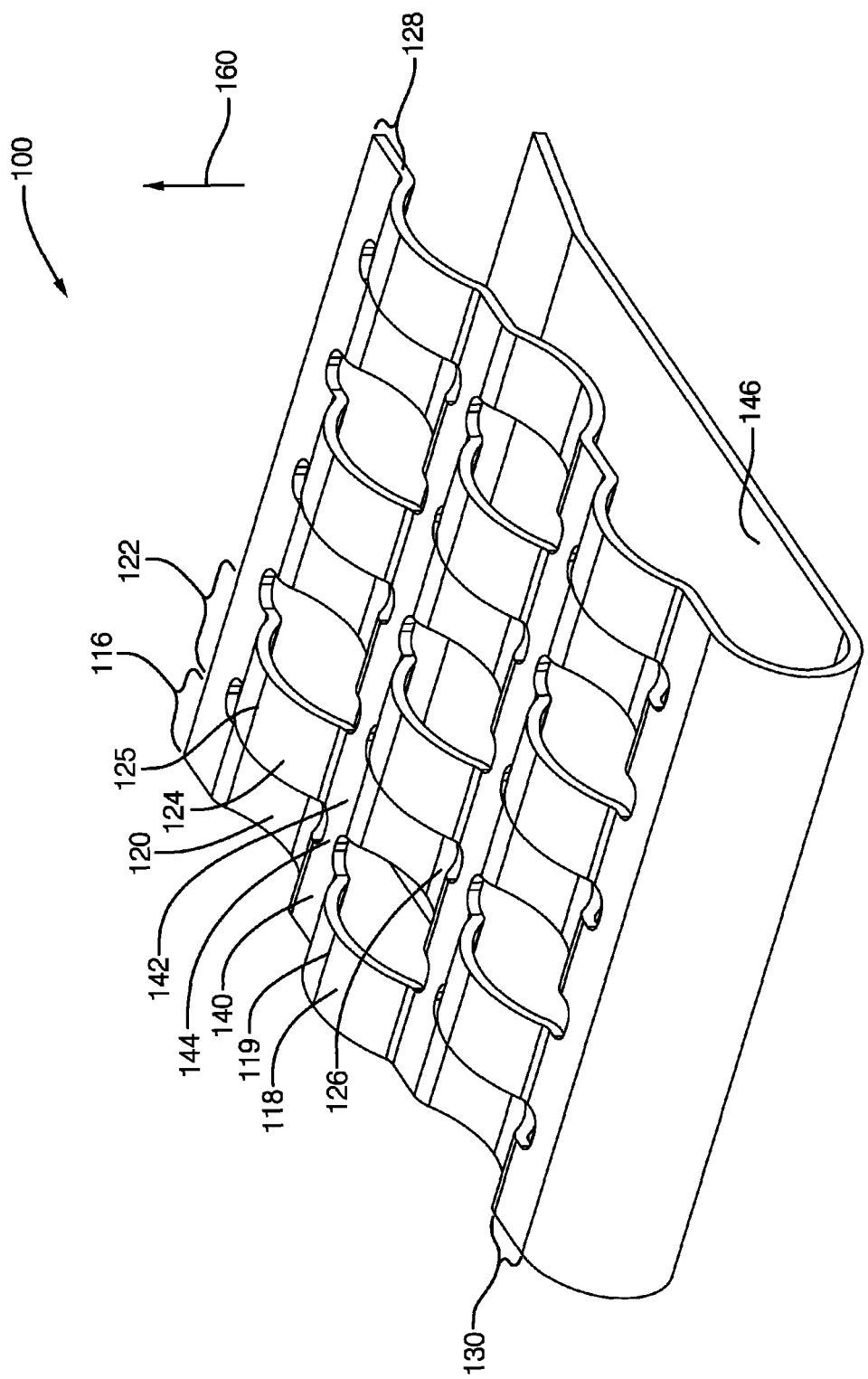
FIG. 1 is a perspective view of a complex wave spring in accordance with one embodiment.
Figure 3:
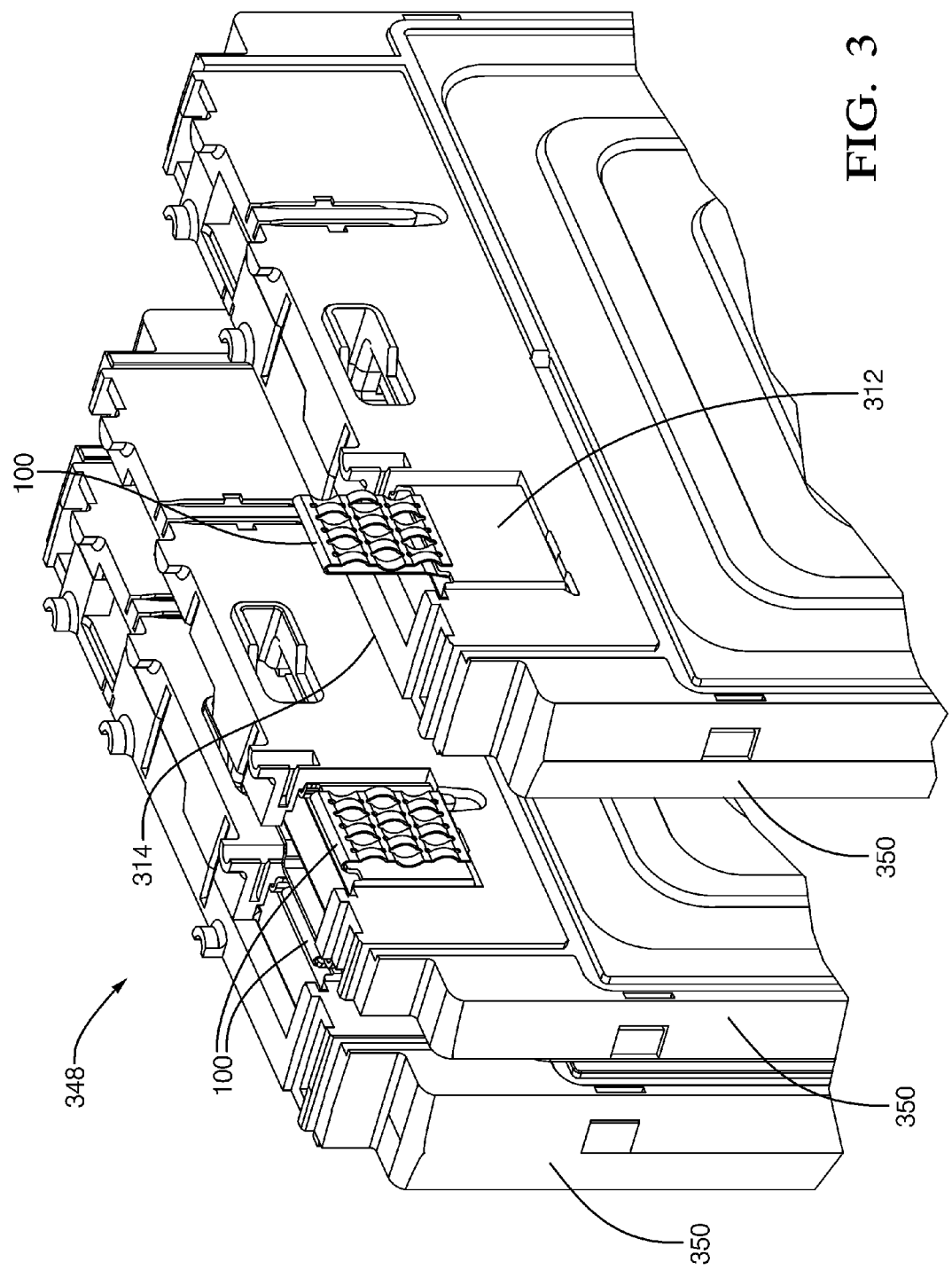
FIG. 3 is an exploded perspective view of an assembly that includes the complex wave spring of FIG. 1 in accordance with one embodiment.

FIG. 1 illustrates a non-limiting example of a complex wave spring or Beer Spring™, hereafter often spring 100. The spring 100 may be used as a compression type spring for generating a spring force corresponding to how much the spring 100 is compressed, or for electrically coupling electrical contact surfaces 312, 314, (FIG. 3). As will be described in more detail herein, the spring 100 may be configured to provide a relatively constant force over a relatively wide range of compression distances. This characteristic may be particularly useful in electronic assemblies for providing a constant force onto a delicate electrical component for the purpose of thermally coupling the electrical component to a heat sink. This characteristic may also be useful to provide a constant electrical contact force between opposed electrical contact surfaces, and provide a plurality of electrically parallel current paths between the electrical contact surfaces.

In one embodiment where the spring is used as an electrical conductor, the spring 100 may be formed of an electrically conductive material suitable for electrically coupling the opposed electrical contact surfaces 312, 314 when the spring 100 is in contact therebetween, that is, in contact with both of the opposed electrical contact surfaces 312, 314. A non-limiting example of a suitable material for the spring 100 may have mechanical characteristics that include E=138,000 MPa, Poisson's' ratio=0.33, Yield Strength 550 MPa, and material thickness=0.3 mm. A non-limiting example of such a material is Beryllium copper The spring 100 may be formed by stamping and bending a sheet of the material using well known tools and methods.

The spring 100 includes a first wave portion 116 that is shaped to define a first upward undulation 118 and a first downward undulation 120. In general, when the opposed electrical contact surfaces 312, 314 are close enough, and the spring 100 is present between the opposed electrical contact surfaces 312, 314, the first upward undulation 118 will make contact with one of the opposed electrical contact surfaces 312, 314, at a point along a line 119 corresponding to the peak of the first upward undulation 118. Similarly, the first downward undulation 120 will make contact with the other of the opposed electrical contact surfaces 312, 314, along a line (not shown) corresponding to the peak of the first downward undulation 120. The contacts at these upward and downward peaks may provide an electrical connection between the opposed electrical contact surfaces 312, 314.

The spring 100 also includes a second wave portion 122 fixedly arranged relative to the first wave portion 116. The second wave portion 122 is shaped to define a second upward undulation 124 proximate to the first downward undulation 120, and a second downward undulation 126 proximate to the first upward undulation 118. The second upward undulation 124 will generally make first contact with a surface along a line 125 at the peak of the second upward undulation The upward and downward undulations 118, 120, 124, 126 cooperate to make multiple electrical contact points with the opposed electrical contact surfaces 312, 314. This configuration of the wave portions 116, 122 arranges the upward and downward undulations 118, 120, 124, 126 to form a checkerboard like pattern of undulations. Such a pattern is advantageous because the amount of pressure between the opposed electrical contact surfaces 312, 314 necessary to have all of the upward and downward undulations 118, 120, 124, 126 in contact with one or the other of the opposed electrical contact surfaces 312, 314 is minimized. Furthermore, this advantageous arrangement of multiple wave portions stands in contrast to a wave spring having a single wave portion that extends across the entire width of the spring in that the single wave configuration risks having a single point contact instead of an expected line of contact if either of the opposed electrical contact surfaces 312, 314 has an irregularity.

The spring 100 may include a first end portion 128 and a second end portion 130 opposite the first end portion 128. The first wave portion 116 and the second wave portion 122 may be connected to and extending between the first end portion 128 and the second end portion 130 in order to support the ends of the first wave portion 116 and the second wave portion 122, as opposed to having either ends of the wave portions unattached to an end portion and so at greater risk of being bent or otherwise damaged.

When viewed from above, the first wave portion 116 and the second wave portion 122 may have similar shapes. As illustrated in FIG. 1, the wave portions 116, 122 may be described as having a linear shape, that is, they are relatively straight. Alternatively the wave portions 116, 122 may be shaped like an S, or have a zigzag shape. Also, the wave portions 116, 122 may not have a constant width, but may be hour-glass shaped. For any of these shapes, the first wave portion 116 and the second wave portion 122 may be arranged in parallel so that, for example, the empty space between the wave portions 116, 122 is minimized.

Non-limiting example dimensions of the spring 100 are now presented. It will be understood that any one or all of the dimensions may be altered to optimize the design of the spring 100 for a particular application. The non-limiting example shown in FIG. 1 has an overall width of about 17 millimeters and an overall length of about 20 millimeters. the width of the first wave portion 116 is about 2 millimeters. The length of any of the upward or downward undulations is about 6 millimeters and the undulations have a height or depth of about 1 mm millimeters, and so the uncompressed thickness of the complex spring 100 in this example is about 2 mm millimeters. It is noted that the dimensions of repeated features are illustrated as being about the same across the spring 100, but some dimensions may be customized for particular applications. For example, the first wave portion 116 and the last wave portion (opposite side of spring) may be made wider than the second wave portion 122 or any of the other intermediate wave portions in order to make the wave spring 100 more robust for handling. Similarly, the length and or deflection of the undulations may be customized for certain applications.

Figure 2:
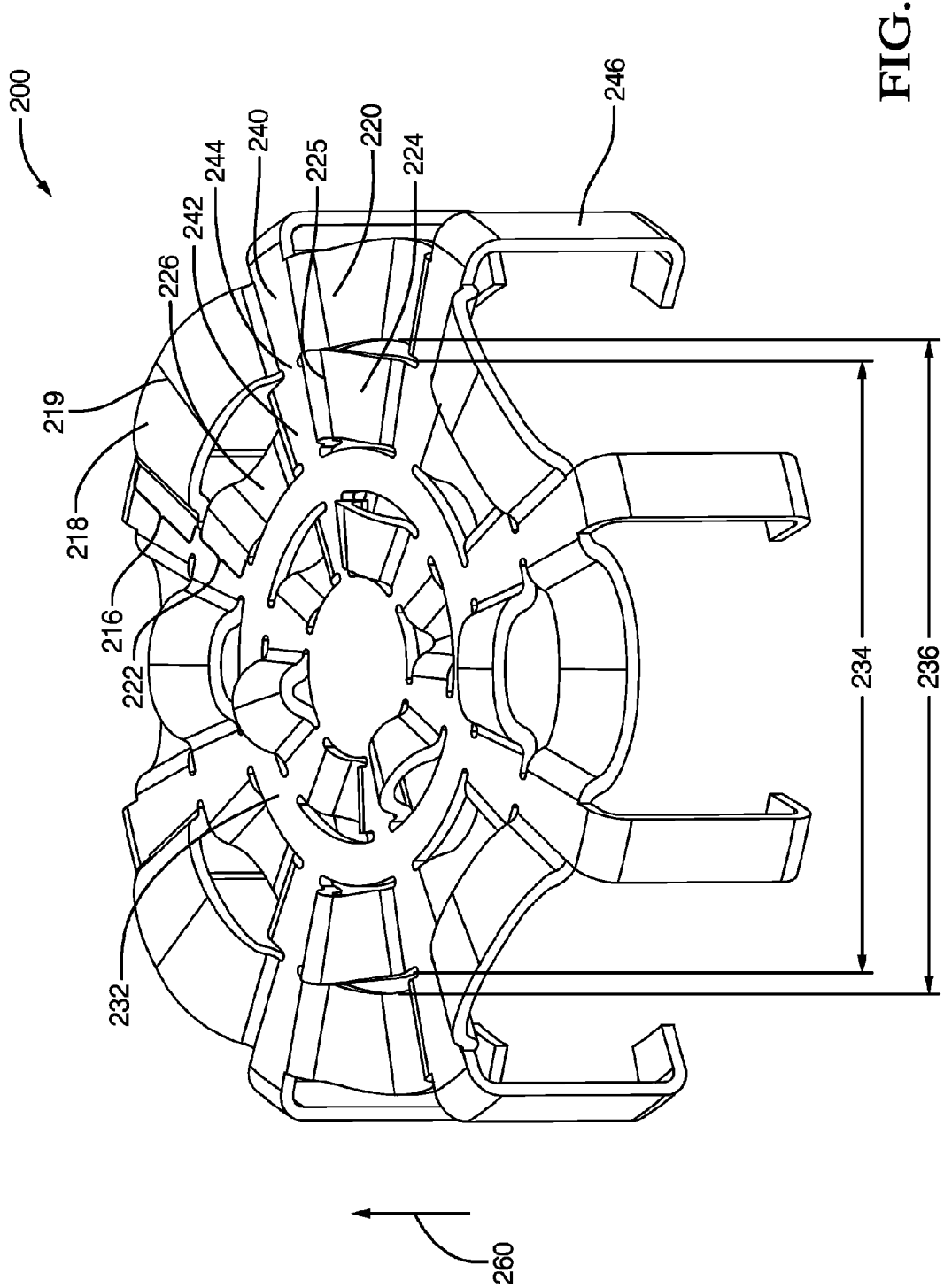
FIG. 2 is a perspective view of a complex wave spring in accordance with one embodiment.

FIG. 2 illustrates another non-limiting example of a spring 200. The spring 200 includes a first wave portion 216 that is characterized as having a closed shape, that is, the first wave portion 216 closes about and defines an open area 232. In this non-limiting example, the first wave portion 216 is, in general, a ring having an outside shape of a circle. Alternatively the outside edge of the first wave portion 216 may be an oval, an ellipse, an irregular curved shape, or a polygon. It is noted that the shape of the outer edge and inner edge of the first wave portion 216 do not need to match. The spring 200 may also include a second wave portion 222 that may also be characterized as having a closed shape sized to fit inside the open area 232 defined by the inner edge of the first wave portion 216. The outer edge of the second wave portion 222 may have a similar shape as the inner edge of the first wave portion 216 in order to minimize the space between the inner edge of the first wave portion 216 and the outer edge of the second wave portion 222. Alternatively the second wave portion 222 may be any shape. Furthermore, the second wave portion 222 may define a second opening smaller than the open area 232 defined by the first wave portion 216, or may occupy the entire area within the outer edge of the second wave portion 222.

Continuing to refer to FIG. 2, in one embodiment the first wave portion 216 may be characterized as having a ring shape that defines an inside diameter 236, the second wave portion 222 may be characterized as having a ring shape that defines an outside diameter 234 less than the inside diameter 236. Non-limiting examples of dimensions for the wave spring 200 illustrated in FIG. 2 are an outside diameter 234 of about 8 millimeters and an inside diameter 236 of about 2 millimeters. In one embodiment, and the first wave portion 216 may be arranged to be concentric to the second wave portion 222.

Similar to the spring 100 illustrated in FIG. 1, the first wave portion 216 illustrated in FIG. 2 is shaped to define a first upward undulation 218 that defines a line 219 of expected first contact when the spring is brought into contact with a surface, and shaped to define a first downward undulation 220. The second wave portion 222 defines a second upward undulation 224 adjacent the first downward undulation 220, and a second downward undulation 226 adjacent the first upward undulation 218. The second upward undulation 224 also defines a line 225 of likely first contact.

Referring again to FIG. 1, the first wave portion 116 may further shaped to define a first node region 140 between the first upward undulation 118 and the first downward undulation 120. In this non-limiting example the first node region 14 is illustrated as being substantially flat, however other shapes are possible. In general, it is desirable for the shape of the node 140 to be different from the curvature of the first upward undulation 118 and the first downward undulation 120 so that, as will be described in more detail below, when the spring is sufficiently compressed between the surfaces 312, 314, the first node region 140, the first upward undulation 118, and the first downward undulation 120 cooperatively deform to establish at least one additional point of contact with at least one of the surfaces 312, 314.

The second wave portion 222 may be further shaped to define a second node region 142 between the second upward undulation 124 and the second downward undulation 126. The node regions 140, 142 may be interconnected by a bridge portion 144. In general, the bridge portion may help to keep the first wave portion 116 and the second wave portion 222 in relative alignment with each other, and increase resistance to handling damage. The bridge adds a torsional spring element to the compression of the undulations providing additional options for spring deflection force tuning and design. Similarly, FIG. 2 illustrates a first node region 240 and a second node region 242 interconnected by a bridge portion 244.

FIG. 3 shows a non-limiting example of an application for the spring 100. FIG. 3 illustrates parts of a lithium-ion type battery 348 found in some hybrid automobiles. Such batteries may include a plurality of frames 350 that are arranged in a stack, and then the stack is secured together to form the battery 348. By using the spring 100, the mechanical tolerances on the frames 350 are reduced because the spring 100 provides an electrical contact that is compliant. After the frames are arranged in the stack, the frames may be compressed together in a manner that applies pressure to the spring 100 while located between the contacts 312, 314, such that an electrical contact is made between the contacts 312, 314.

Figure 4:
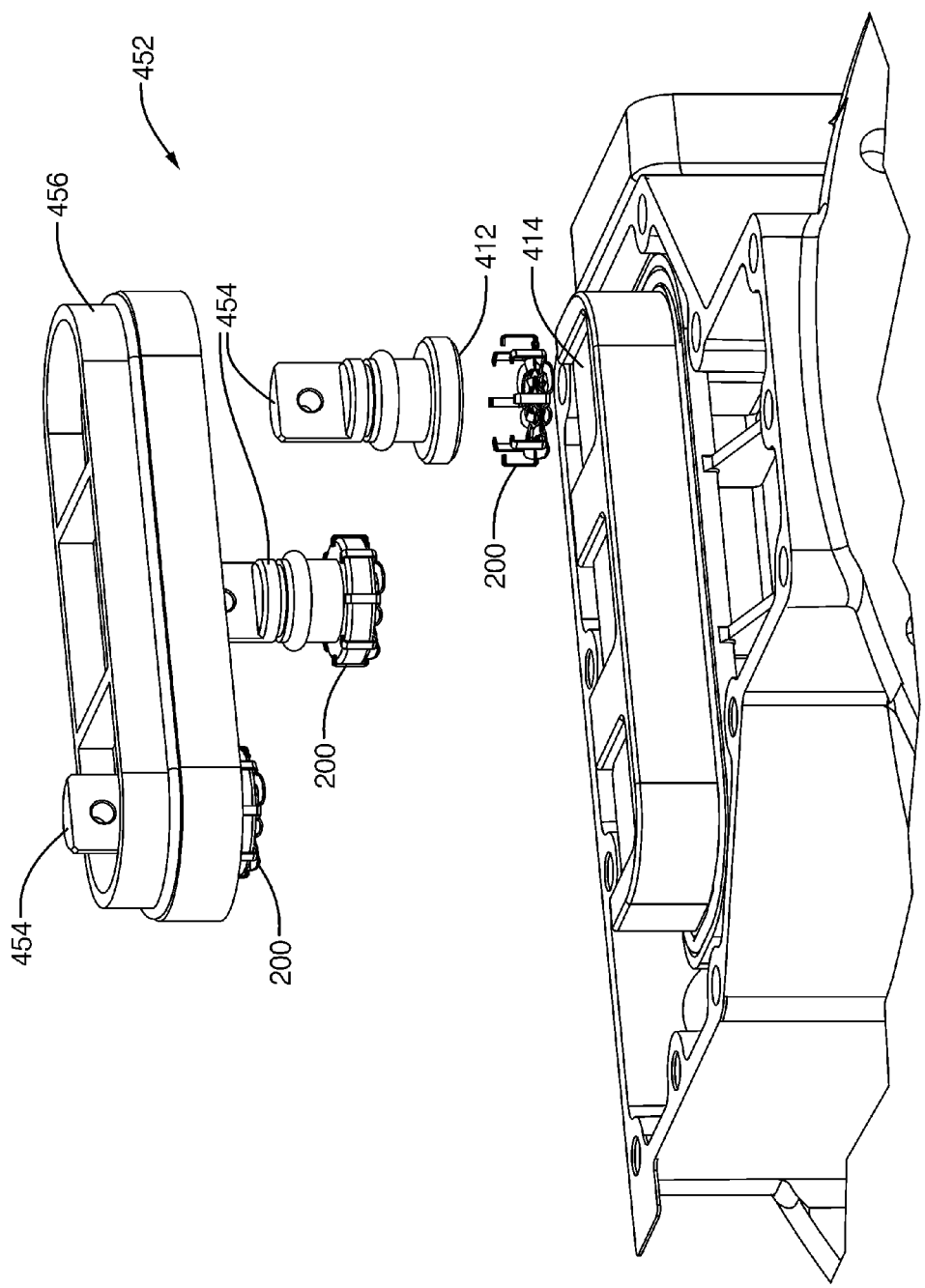
FIG. 4 is an exploded perspective view of an assembly that includes the complex wave spring of FIG. 2 in accordance with one embodiment.

FIG. 4 shows a non-limiting example of a motor/generator assembly 452 found in some hybrid automobiles. Such assemblies control large amounts of current, and so a low contact resistance through the connection system in important. In this example, the spring 200 is attached to a conductor pin 454 and then assembled into a carrier 456. The carrier 456 is then placed onto the assembly 452 and may be secured to the assembly 452 with screws (not shown) or a cover (not shown). Here, because of the configuration of the spring 200, the four relatively small screws are able to provide sufficient clamping force between the contacts 412, 414 for the spring 200 to provide a high current connection. This arrangement is advantageous when making blind mate type electrical connections where the integrity of the electrical contact is not viewable when the parts are assembled. Additionally, any electric machine cooling is fully sealed from the power electronics and the environment when mated. The carrier shrouds may provide a Faraday or electromagnetic shield and an environmental seal. Internal to the electric machine the copper conductive interface is extremely package size efficient and so requires very little intrusion into the body of electric machine.

Figure 5:
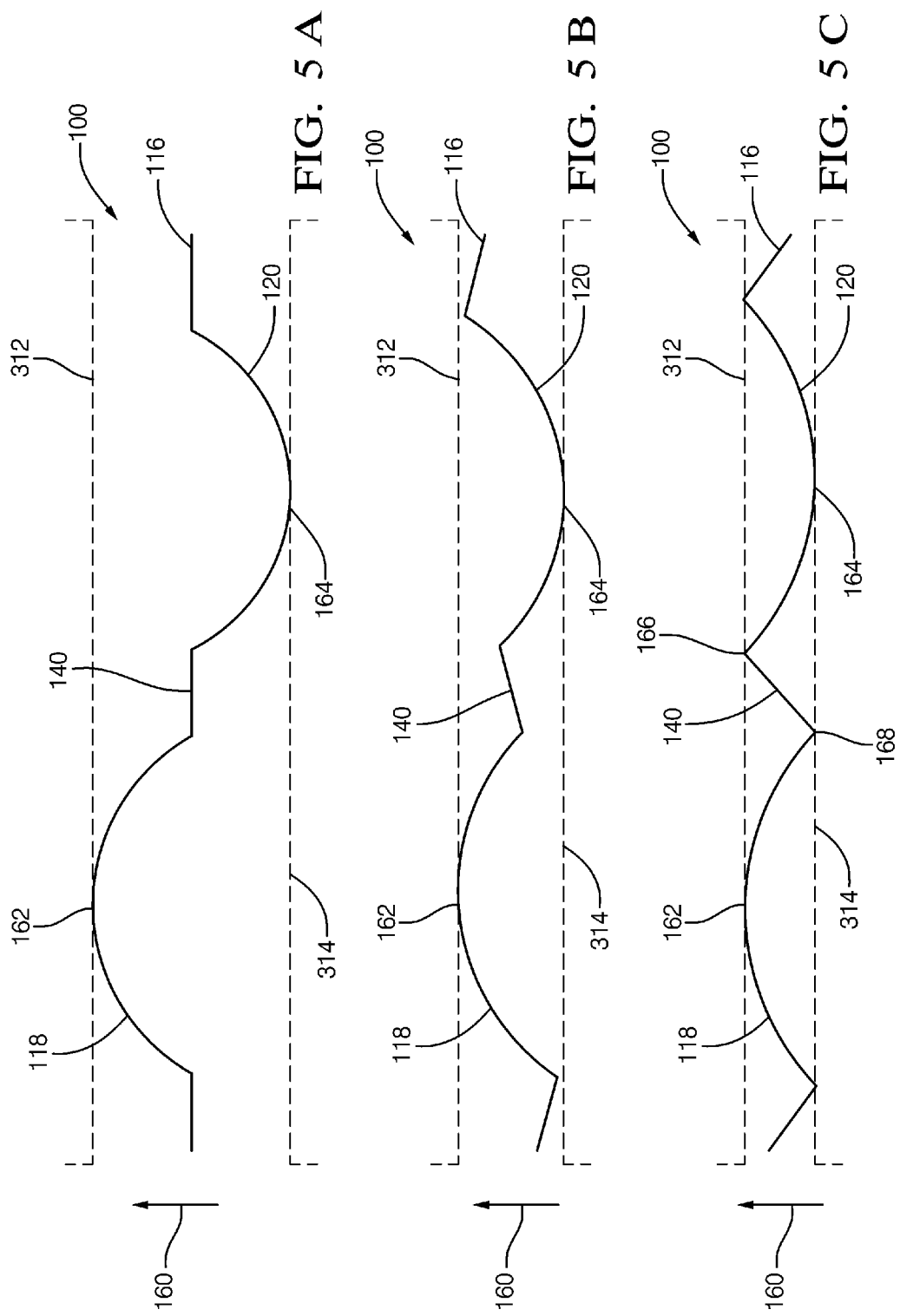
FIG. 5A-C is a sequence of cross sectional views of the complex spring of FIG. 1 as the spring is compressed.

Referring again to FIG. 1, the spring 100 may be characterized as having a substantially planar shape defining an axis 160 normal to the plane of the spring 100. FIGS. 5A, 5B, and 5C are finite element simulations using the computer program Ansys®. FIG. 5A illustrates a cross section of part of the first wave section 116. In this illustration the spring 100 is in contact with surfaces 312, 314, and the surfaces are characterized as being substantially normal to the axis 160 and arranged on opposite sides of the spring 100. The distance between the surfaces 312, 314 is such that the spring 100 is generally characterized as being uncompressed or not substantially compressed by the surfaces. As such, the spring 100 generally makes contact with the surfaces 312, 314 only at points 162, 164 corresponding to the peaks of the first upward undulation 118 and first downward undulation 120 respectively. FIG. 5B illustrates the surfaces 312, 314 as being closer together, and the node 140 tilts to compensate for the increasing effective length of the first upward undulation 118 and first downward undulation 120. FIG. 5C illustrates how when the spring 100 is sufficiently compressed between the surfaces 312, 314, the first node region 140, the first upward undulation 118, and the first downward undulation 120 cooperatively deform to establish at least one additional point of contact 166, 168 with at least one of the surfaces 312, 314.

Figure 6:
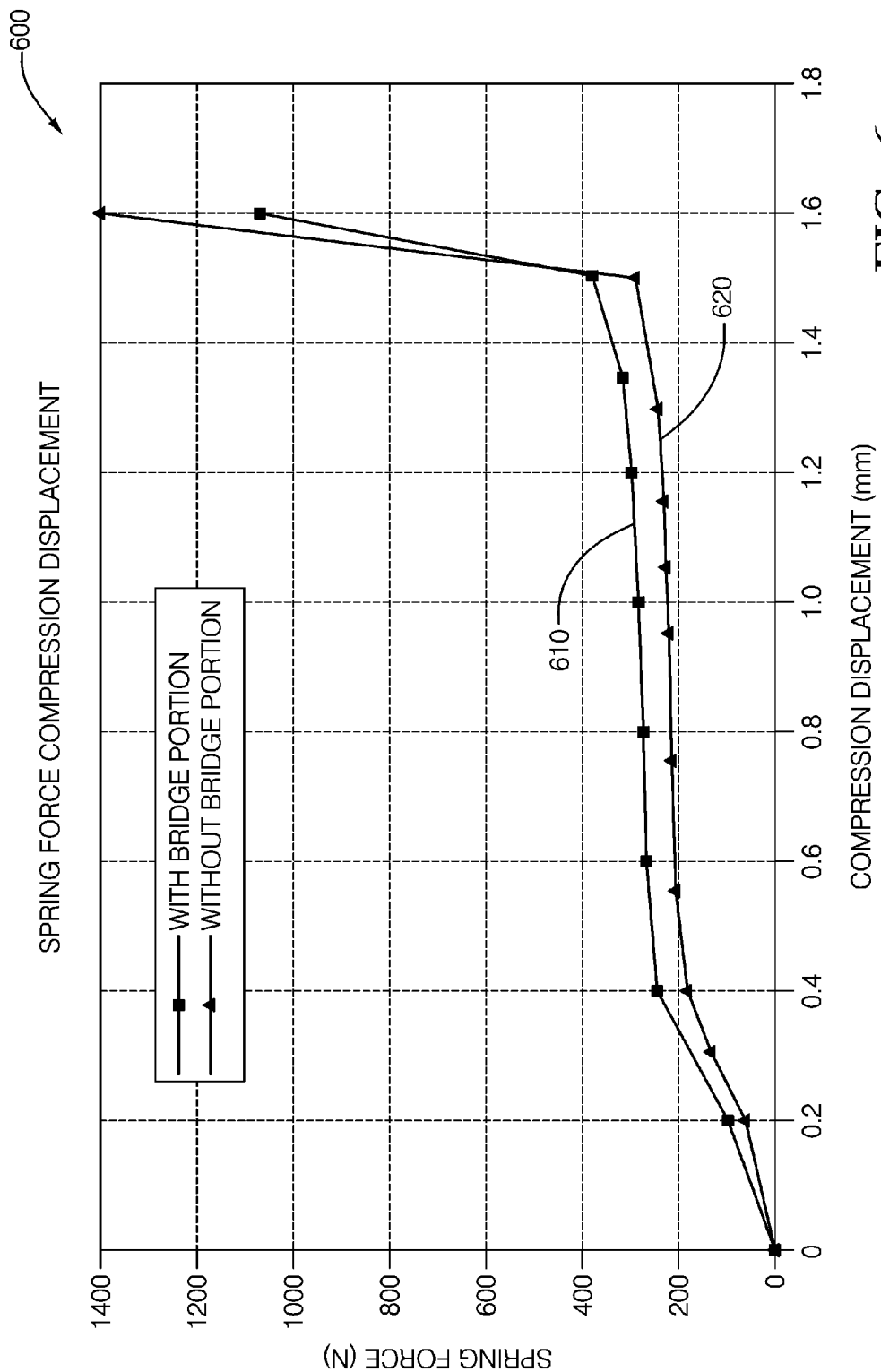
FIG. 6 is a graph of spring force versus compression displacement of the complex spring of FIG. 1.

Referring again to FIG. 1, the second wave portion 122 may be further shaped to define a second node region 142 between the second upward undulation 124 and the second downward undulation 126. The spring 100 may also include a bridge portion 144 interconnecting the first node region 140 and the second node region 160. FIG. 6 illustrates a graph 600 of simulated data showing spring force versus compression displacement (i.e. decreasing distance between surfaces 312, 314) for a complex spring similar to spring 100. Curve 610 corresponds to a spring design that includes a plurality of torque ties similar to the bridge portion 144, and curve 620 corresponds to a similar spring without any torque ties included. While not subscribing to any particular theory, the addition of the bridge portions 144 appear to increase the spring force while still maintaining the desirably flat spring force value for compression displacements between about 0.4 mm and 1.5 mm.

While the examples described herein are generally directed toward electrical contacts that are brought into contact with the spring 100 by bringing the contacts toward each other in a direction normal to the plane of the spring 100, the spring 100 may also be used in an interference fit type that brings the contacts toward each other in a direction parallel to the plane of the spring 100, for example a blade type terminal being plugged into a socket, for example a 110VAC type plug being inserted into a 110VAC wall outlet.

FIGS. 1 and 2 also illustrate non limiting examples of an attachment tab 146, 246 useful to attach the spring 100, 200 proximate to an electrical contact surface 312, 412 in order to keep the spring proximate to the electrical contact surface 312, 412 during subsequent assembly steps as illustrated in FIGS. 3 and 4.

Accordingly, a complex wave spring or Beer Spring™ (100, 200) for electrically coupling opposed electrical contact surfaces is provided. The spring may be particularly useful to equalize contact pressure of multiple blind electrical connections and/or multiple blind thermal contacts that may have variable distances between the various connection sites. The multiple upward and downward undulations are effective to provide a secure electrical contact between planar contacts over wide range of planar contact pressures and separation distances. The Beer Spring™ differs from other wave springs in that the spring has multiple wave spring portions in generally radial or parallel arrangements, where each wave spring portion defines undulations that are opposite to an adjacent undulation. This configuration provides an unusual spring force versus compression displacement characteristic that is substantially constant over a relatively wide displacement range.

While this invention has been described in terms of the preferred embodiments thereof, it is not intended to be so limited, but rather only to the extent set forth in the claims that follow.

We claim:
1. A complex wave spring comprising:
   a first wave portion shaped to define at least a first upward undulation and a first downward undulation; and
   a second wave portion fixedly arranged relative to the first wave portion, said second wave portion shaped to define at least a second upward undulation proximate to the first downward undulation, and a second downward undulation proximate to the first upward undulation, wherein
   the first wave portion is further shaped to define a first node region between the first upward undulation and the first downward undulation,
   the spring is characterized as having a substantially planar shape defining an axis normal thereto,
   the spring is configured such that when the spring is in contact with surfaces characterized as being substantially normal to the axis and arranged on opposite sides of the spring, and the spring is not substantially com- pressed by the surfaces, the spring makes contact with the surfaces only at points corresponding to the peaks of the undulations, and when the spring is sufficiently compressed between the surfaces, the first node region, the first upward undulation, and the first downward undulation cooperatively deform to establish at least one additional point of contact with at least one of the surfaces.

2. The spring in accordance with claim 1, wherein the spring further comprises a first end portion and a second end portion opposite the first end portion, wherein the first wave portion and the second wave portion extend therebetween.

3. The spring in accordance with claim 2, wherein the first wave portion and the second wave portion are characterized as having similar shapes, and the first wave portion is arranged parallel to the second wave portion.

4. The spring in accordance with claim 3, wherein the first wave portion and the second wave portion are characterized as having linear shapes.

5. The spring in accordance with claim 1, wherein the first wave portion is characterized as having a closed shape that defines an open area within the first wave portion, and the second wave portion is characterized as having a closed shape sized to fit inside the open area.

6. The spring in accordance with claim 5, wherein the first wave portion is characterized as having a ring shape that defines an inside diameter, the second wave portion is characterized as having a ring shape that defines an outside diameter less than the inside diameter.

7. The spring in accordance with claim 6, wherein the first wave portion is arranged concentric to the second wave portion.

8. The spring in accordance with claim 1, wherein the spring is formed of electrically conductive material suitable for electrically coupling electrical contact surfaces when the spring is in contact therebetween.

9. The spring in accordance with claim 1, wherein the first node region is characterized as being substantially flat.

10. The spring in accordance with claim 1, wherein the second wave portion is further shaped to define a second node region between the second upward undulation and the second downward undulation; and the spring further comprises a bridge portion interconnecting the first node region and the second node region.

11. The spring in accordance with claim 1, wherein the spring further comprises an attachment tab configured to attach the spring proximate to a surface.

* * * * *